United States Patent [19]

Franz

[11] Patent Number: 5,431,064
[45] Date of Patent: Jul. 11, 1995

[54] TRANSDUCER ARRAY

[75] Inventor: Patrick J. Franz, Portland, Oreg.

[73] Assignee: Home Row, Inc., Clackamas, Oreg.

[21] Appl. No.: 948,143

[22] Filed: Sep. 18, 1992

[51] Int. Cl.[6] .............................................. G01L 1/00
[52] U.S. Cl. ................... 73/862.68; 73/862.392
[58] Field of Search ................... 73/862.046, 862.041, 73/862.68, 767; 382/4, 5; 338/49

[56] References Cited

U.S. PATENT DOCUMENTS

| | | | |
|---|---|---|---|
| D. 258,216 | 2/1981 | Eventoff | D17/99 |
| 2,042,606 | 6/1936 | Kotowski | 201/50 |
| 3,503,031 | 3/1970 | Nyhus et al. | 338/99 |
| 3,608,370 | 9/1971 | Vollenweider et al. | 73/862.68 |
| 3,699,294 | 10/1972 | Sudduth | 200/166 |
| 3,806,471 | 4/1974 | Mitchell | 252/518 |
| 3,838,888 | 10/1974 | Gynn | 303/20 |
| 3,875,434 | 4/1975 | Harden et al. | 307/308 |
| 3,894,437 | 7/1975 | Hagy et al. | 63/862.68 |
| 3,898,421 | 8/1975 | Suzumura | 200/159 |
| 3,987,259 | 10/1976 | Larson | 200/5 |
| 4,013,835 | 3/1977 | Eachus et al. | 178/18 |
| 4,014,217 | 3/1977 | Kagasse et al. | |
| 4,017,697 | 4/1977 | Larson | 200/5 |
| 4,018,999 | 4/1977 | Robinson et al. | 200/5 |
| 4,034,176 | 7/1977 | Larson | 200/159 |
| 4,046,975 | 9/1977 | Seeger, Jr. | 200/5 |
| 4,054,540 | 10/1977 | Michalchik | 252/512 |
| 4,065,649 | 12/1977 | Carter et al. | 200/5 |
| 4,085,302 | 4/1978 | Zenk et al. | 200/5 |
| 4,106,370 | 8/1978 | Kraus et al. | 73/88 |
| 4,114,134 | 9/1978 | Kley | 338/184 |
| 4,145,317 | 3/1979 | Sado et al. | 252/512 |
| 4,163,204 | 7/1979 | Sado et al. | 338/99 |
| 4,210,895 | 7/1980 | Sado et al. | 338/99 |
| 4,235,141 | 11/1980 | Eventoff | 84/1.01 |
| 4,268,815 | 5/1981 | Eventoff et al. | 338/699 |
| 4,276,538 | 6/1981 | Eventoff et al. | 338/69 |
| 4,301,337 | 11/1981 | Eventoff | 200/5 |
| 4,306,480 | 12/1981 | Eventoff et al. | 84/1.01 |
| 4,314,227 | 2/1982 | Eventoff | 338/99 |
| 4,314,228 | 2/1982 | Eventoff | 338/114 |
| 4,315,238 | 2/1982 | Eventoff | 338/99 |
| 4,410,872 | 10/1983 | Stecher et al. | 338/114 |
| 4,426,884 | 1/1984 | Polchaninoff | 73/172 |
| 4,441,097 | 4/1984 | Anderson | 340/365 |
| 4,451,714 | 5/1984 | Eventoff | 200/5 |
| 4,479,392 | 10/1984 | Froeb et al. | 73/862 |
| 4,489,302 | 12/1984 | Eventoff | 338/99 |
| 4,492,949 | 1/1985 | Peterson et al. | |
| 4,493,219 | 1/1985 | Sharp et al. | 73/862 |
| 4,575,601 | 3/1986 | Taguchi et al. | |
| 4,599,496 | 7/1986 | Lecklider | 200/1 |

(List continued on next page.)

Primary Examiner—Richard E. Chilcot, Jr.
Assistant Examiner—R. Biegel
Attorney, Agent, or Firm—Marger, Johnson, McCollom & Stolowitz

[57] ABSTRACT

A pressure sensitive transducer array in which a plurality of transducers are connected in series and in parallel with one another. In one embodiment, a resistive layer is formed from carbon or silver ink on a polyester film. A plurality of conductive shunt elements having greater conductivity than the resistive layer is formed on a second polyester film. The films are placed adjacent to one another with the shunt elements contacting the resistive layer. Voltage is applied across the resistive layer and pressure is applied thereto. As the pressure increases, the number of current paths set up through contact points on the shunt elements increase thereby decreasing the resistance across the resistive layer and increasing current flow. In another embodiment a plurality of plate elements are contained in a plane on one side of a dielectric layer. A plurality of plate elements are contained in a plane on the other side of the dielectric layer. As the layer is pushed together responsive to force applied, total capacitance as measured across the planes of plate elements varies.

58 Claims, 8 Drawing Sheets

U.S. PATENT DOCUMENTS

| | | | |
|---|---|---|---|
| 4,649,784 | 3/1987 | Fulks et al. | 84/1.1 |
| 4,654,647 | 3/1987 | Wedam | 340/709 |
| 4,673,919 | 6/1987 | Kataoka | 340/365 |
| 4,680,577 | 7/1987 | Straayer et al. | 340/711 |
| 4,703,663 | 11/1987 | Oppermann | 73/862.68 |
| 4,734,034 | 3/1988 | Maness et al. | 433/68 |
| 4,739,299 | 4/1988 | Eventoff et al. | 338/99 |
| 4,745,301 | 5/1988 | Michalchik | 307/119 |
| 4,763,534 | 8/1988 | Hager | 73/862.68 |
| 4,780,701 | 10/1988 | Eppinger | 338/196 |
| 4,787,051 | 11/1988 | Olson | 364/518 |
| 4,793,193 | 12/1988 | Borgudd | 73/862 |
| 4,794,366 | 12/1988 | Sakamoto | 338/114 |
| 4,799,381 | 1/1989 | Tromp | 73/146 |
| 4,810,992 | 3/1989 | Eventoff | 338/99 |
| 4,816,200 | 3/1989 | Stecher et al. | 264/59 |
| 4,847,586 | 7/1989 | Tanaga et al. | 338/114 |
| 4,856,993 | 8/1989 | Maness et al. | 433/68 |
| 4,874,549 | 10/1989 | Michalchik | 252/511 |
| 4,897,629 | 1/1990 | Lecklider | 338/128 |
| 4,931,781 | 6/1990 | Miyakawa | 340/706 |
| 4,933,660 | 6/1990 | Wynne, Jr. | 338/114 |
| 4,951,985 | 8/1990 | Pong et al. | 293/102 |
| 4,963,702 | 10/1990 | Yaniger et al. | 178/18 |
| 4,972,056 | 11/1990 | Wu | 200/276 |
| 4,983,786 | 1/1991 | Stevens et al. | 178/18 |
| 4,996,511 | 2/1991 | Ohkawa et al. | 338/114 |
| 5,012,231 | 4/1991 | Felsenstein | 340/709 |
| 5,053,585 | 10/1991 | Yaniger | 178/18 |
| 5,086,785 | 2/1992 | Gentile et al. | 128/782 |
| 5,157,372 | 10/1992 | Langford | 338/211 |
| 5,172,114 | 12/1992 | Bedoya et al. | |
| 5,278,557 | 1/1994 | Stokes et al. | |

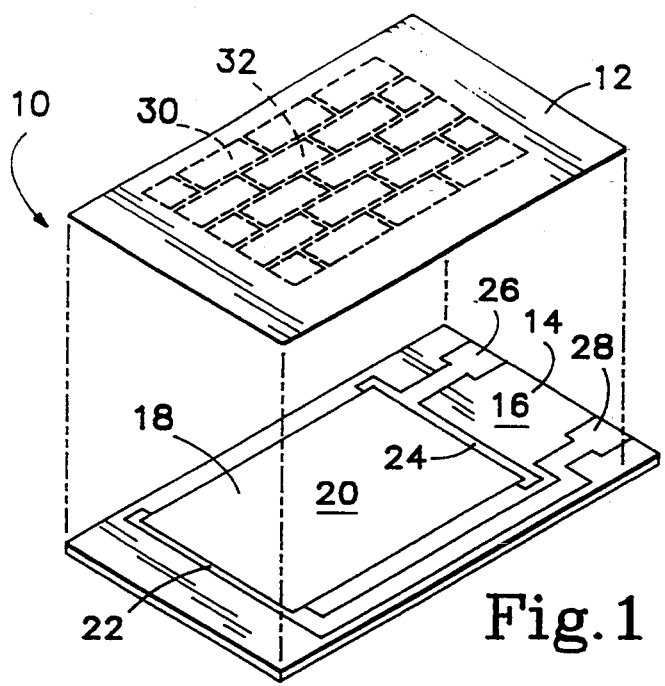
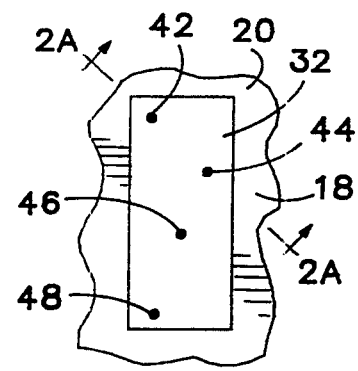
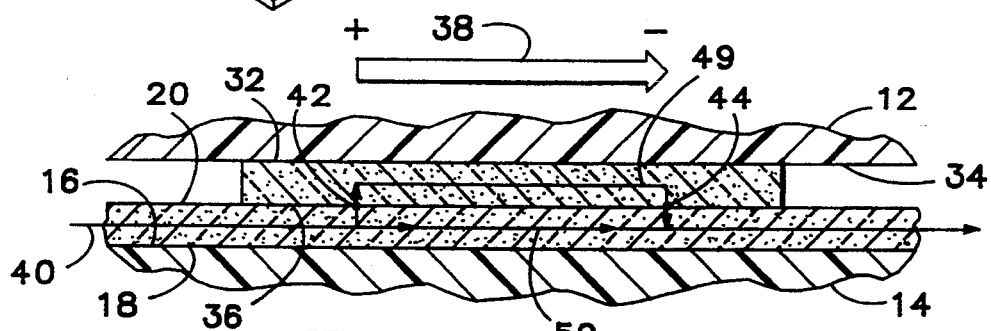
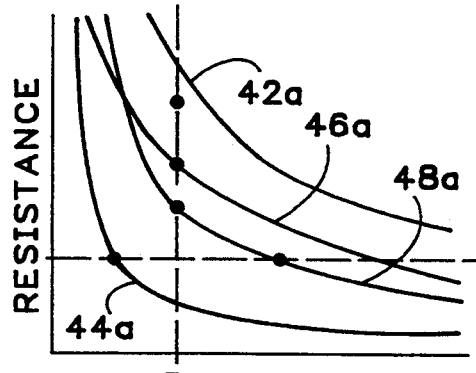
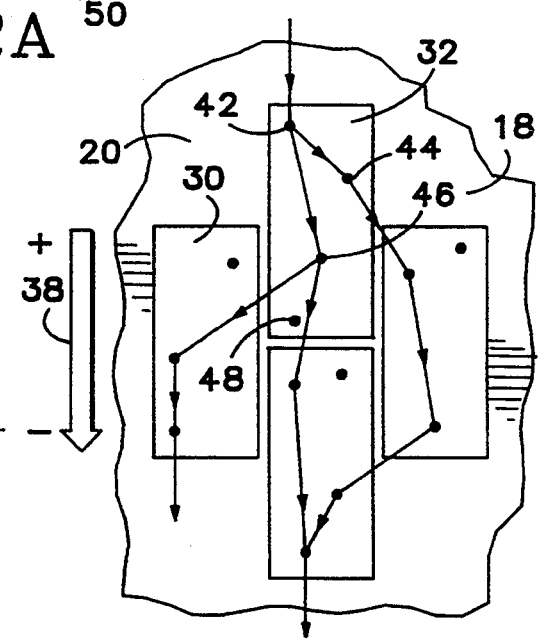
Fig. 1
Fig. 2B
Fig. 2A
Fig. 2C
Fig. 2D

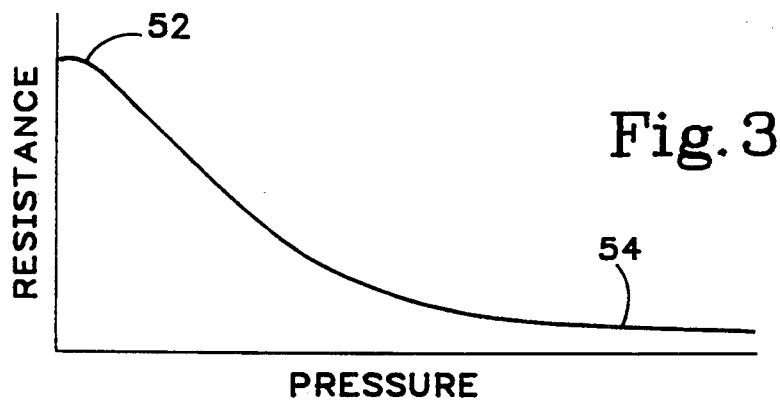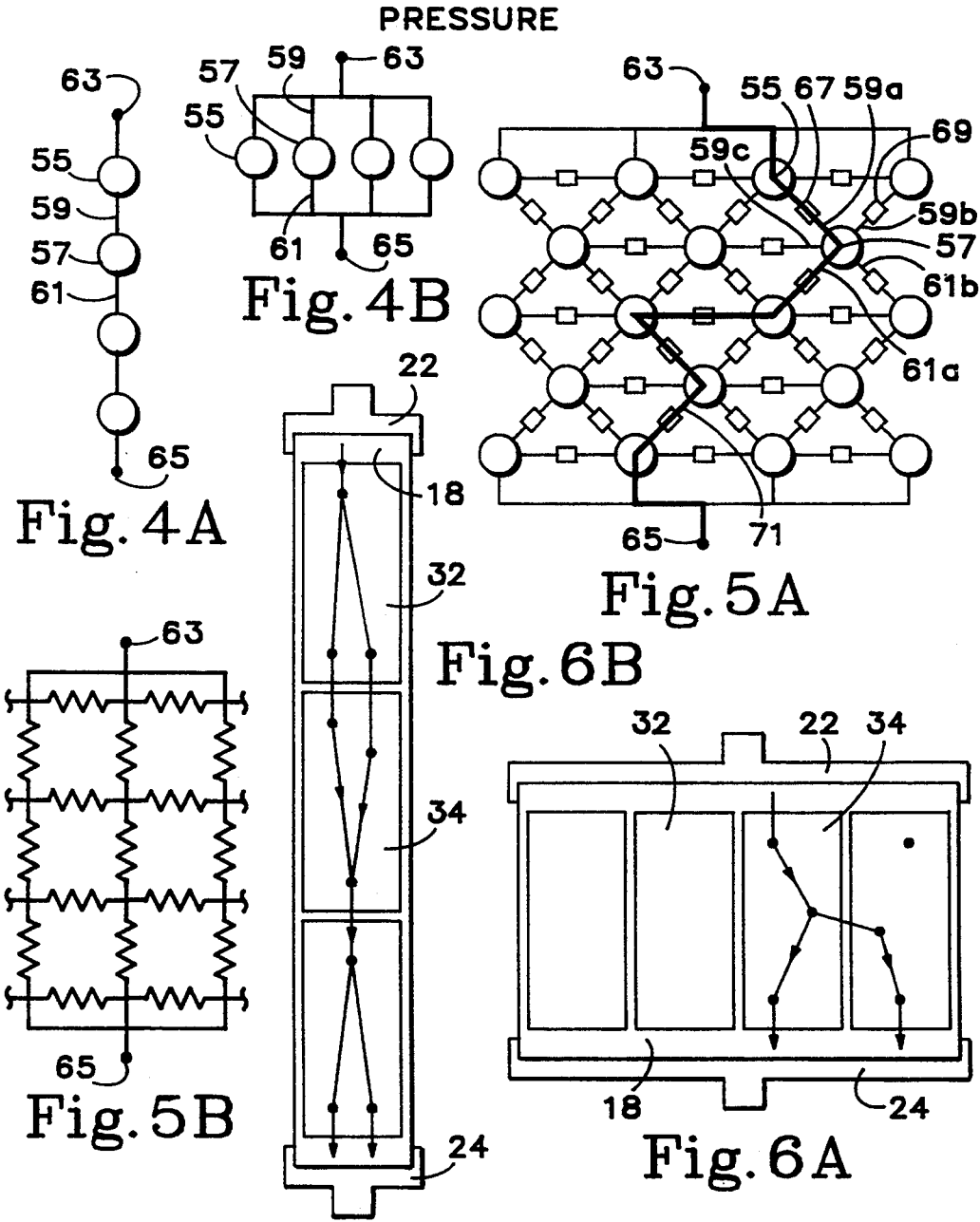

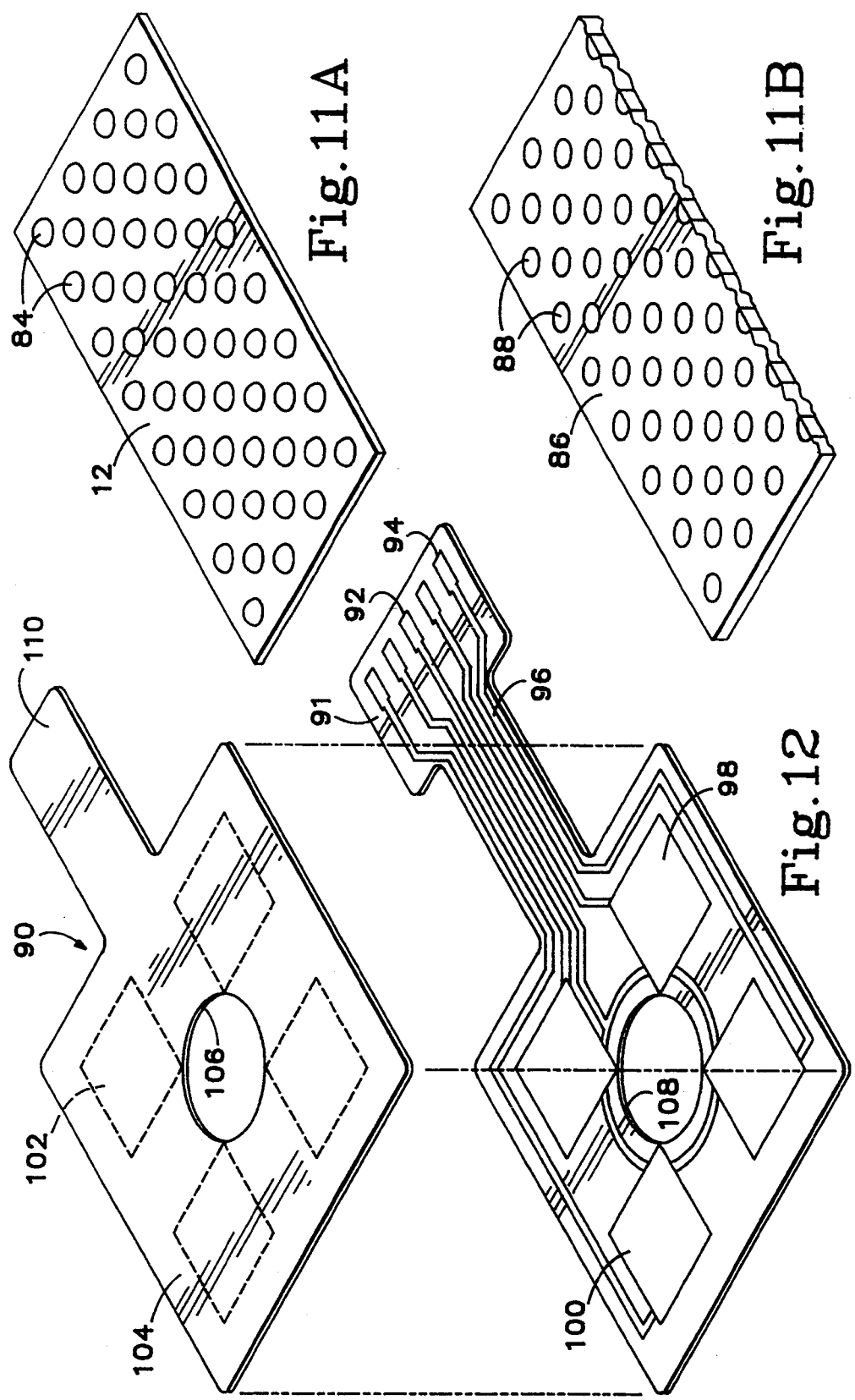

TRANSDUCER ARRAY

BACKGROUND OF THE INVENTION

1. Field of the Invention

The present invention relates generally to sensing the level of a first form of energy and convening it to a corresponding value in a second form of energy and more particularly to doing so with an array of transducers.

2. Description of the Related Art

When measuring a given phenomenon, for example measuring pressure with a transducer which converts a change in pressure to a related change in electrical resistance, it is desirable that the conversion be smooth and repeatable. In many applications, such as pressure operated controls or process sensors, a linear transducer response is also desirable.

Prior art transducers have a number of inherent disadvantages. Several methods have been developed in the prior art to compensate for the disadvantages. For example, electrical circuits are used to filter noise, to average signals which waiver over time and to linearize the response of the transducer. Such circuits add expense, as well as limitations of their own, to the combined response of the transducer and associated compensating circuitry.

U.S. Pat. No. 4,314,227 to Eventoff discloses an electronic pressure sensitive transducer which produces a decreasing resistance responsive to increasing pressure applied to the transducer. In Eventoff, two sets of relatively conductive contact fingers are interleaved with one another. The interleaved fingers are pressed against a less conductive facing layer. So doing forms a plurality of parallel connections between the two sets of interleaved fingers through the resistive surface. When the pressure applied to the transducer is relatively low, the number of contacts formed between the fingers through the facing layer is also low. In this operating range, the transducer exhibits an unrepeatable, nonlinear response. In this range the transducer is also relatively noisy. As pressure applied to the transducer increases, the number of connections between the fingers also increases. In this range the response is more repeatable although still nonlinear until fairly high pressures are applied.

Because each of the connections between the interleaved fingers through the facing layer are electrically in parallel with one another, a single low resistance connection can dominate the response of the transducer unless the number of connections is very large. As noted above, when a relatively low pressure is applied to the transducer, the number of connections is not large. In the presence of one or more low resistance connections, transducer response tends to be noisy and very nonlinear. Such low resistance connections may arise in a number of ways, such as variations in the surface finish of the interleaved fingers, variations in the resistance of the facing layer or as a result of physical damage to the transducer. Increasing the number of interleaved fingers increases the number of potential connections and thus reduces the problem. In practice, however, there is a limit to the number and separation of the fingers that can be reliably produced without occasional shorting between the fingers. Such shorting renders the transducer useless.

U.S. Pat. No. 4,897,629 to Lecklider discloses a variable control device comprising a conductive elastomeric material urgeable against an adjacent resistive layer. As the elastomeric material is pressed onto the resistive layer, it shunts a progressively larger area of the resistive layer thereby lowering the resistance between two electrodes connected to opposite edges of the resistive layer. Such a transducer exhibits a range of responses depending upon the resistances of the elastomer and the resistive layer as well as the shapes of the elastomer and the surface of the resistive layer where they touch one another. Relatively low noise, linear responses may be obtained when the resistances of the elastomer and resistive layer as well as the shapes thereof are carefully controlled.

The Lecklider transducer, as well as other transducers utilizing elastomeric material, suffer from several disadvantages. Conductive elastomers exhibit creep effects over time which inject hysteresis into the transducer response. Temperature variations change the elasticity of the material and therefore the response of the transducer. In addition, the elastomeric material must be formed into selected shapes. Regardless of the shape, contacts between the elastomeric material at the leading and trailing edges thereof dominate transducer response. Careful control of the shape contacting the resistive layer is therefore required for good response. In order to deform the elastomeric material, movement is required. In many applications, however, no movement or very little movement of the transducer or the transducer actuator is desired.

U.S. Pat. No. 4,479,392 to Froeb et al. discloses a force transducer which produces a varying resistance responsive to varying force applied thereto. The Froeb et al. transducer includes a planar low resistant shunt opposite a planar resistive surface. Both the shunt and resistive area are formed from inks silkscreened onto opposed planar insulating substrates. One of the substrates is a film against which an actuator is movable in order to urge progressively increasing surface areas of the resistive layers together responsive to increasing force. A conductive elastomer is not required but careful control of the shape of the actuator is necessary. The opposing resistive layers must be spaced apart to insure that the only area of contact is that resulting from force applied to the actuator.

A linear relationship between force applied to the actuator and the surface area of the contact created is desirable, but difficult to achieve in practice. A further disadvantage is that only the contact points along the leading and trailing edges of the contact area determine transducer response. Care must therefore be taken to control the progression of leading and trailing edges responsive to applied force. Appreciable movement of the actuator is required which, as noted above, is not desirable in many sensing applications. Because the actuator is preferably formed from elastomeric material, the relationship between actuator force applied to the actuator and the shunted surface area may change with time and temperature.

Another problem in prior art transducers is a lack of control of manufacturing parameters which can affect sensitivity and response characteristics of the transducer. Such parameters may include resistance between the contacts made by the opposing layers, shape of the contact or the resistance of an elastomeric material. It may be difficult to control these parameters closely, especially in high volume manufacturing. It would be desirable to have easily controlled manufacturing parameters which can be easily varied to define a desired transducer response.

SUMMARY OF THE INVENTION

The present invention comprises apparatus for sensing the level of a first form of energy and converting it to a corresponding value in a second form of energy. A plurality of transducers are interconnected in an array in which substantially all of the transducers are connected to other transducers by series connections and by parallel connections. Each transducer is operable to sense the level of a first form of energy and convert it to a corresponding value in a second form of energy. A device for measuring the second form of energy is connected to a plurality of transducers on the periphery of the array for measuring an array response when the first form of energy is applied to the array. A method in accordance with the present invention is also provided.

It is a general object of the present invention to provide a transducer array which overcomes the problems associated with prior art transducers.

It is another object of the present invention to provide such a transducer array which has a stable and repeatable response.

It is another object to provide such a transducer array having a linear response and relatively low noise.

It is another object to provide such a transducer array which has a stable response throughout its operating range including at very low applied forces.

It is another object to provide such a transducer array which is not prone to shorting resulting either from the manufacturing process or from physical damage.

It is another object of the invention to provide such a transducer array in which failure of a portion thereof does not have a significant effect on the overall response.

It is another object to provide such a transducer array without conductive elastomers or shaped elastomeric actuators.

It is another object to provide such a transducer array which is very thin and which does not require appreciable motion to actuate it.

It is another object to provide such a transducer array in which substantially the entire transducer area contributes to transducer response for all ranges of operation.

It is another object to provide such a transducer array in which transducer sensitivity, linearity and operating range are controlled by parameters which can be easily controlled even when the transducer is manufactured in large quantities.

BRIEF DESCRIPTION OF THE DRAWINGS

FIG. 1 is an exploded perspective view of a transducer constructed in accordance with the present invention.

FIG. 2A is an enlarged cross-sectional view taken along line 2A—2A in FIG. 2B illustrating a current flow path through a resistive layer and an adjacent shunt element.

FIG. 2B is an enlarged view of a shunt element and a portion of the adjacent resistive layer in the transducer of FIG. 1 and schematically illustrating several electrical contact points between the shunt element and resistive layer.

FIG. 2C is a graph of pressure versus resistance for each of the contact points illustrated in FIG. 2B.

FIG. 2D is an enlarged plan view of four of the shunt elements of the transducer of FIG. 1 and the adjacent resistive layer illustrating a plurality of current paths formed by electrical contacts between the shunt elements and resistive layer.

FIG. 3 is a graph of pressure versus resistance for the transducer of FIG. 1.

FIG. 4A is a schematic representation of a transducer array having serial interconnections.

FIG. 4B is a schematic representation of a transducer array having parallel interconnections.

FIG. 5A is a schematic representation of a transducer having series-parallel interconnections according to the present invention.

FIG. 5B is a schematic diagram of series-parallel connections made in the embodiment of FIG. 1.

FIG. 6A is a plan view of a parallel pattern of shunt elements according to the present invention illustrating a plurality of series-parallel current paths.

FIG. 6B is a plan view of a series pattern of shunt elements according to the present invention and also indicating a plurality of series-parallel current paths.

FIG. 11A is a partial perspective view of another embodiment of the invention.

FIG. 11B is a partial perspective similar to FIG. 11A of yet another embodiment of the invention.

FIG. 12 is an exploded perspective view of a transducer constructed in accordance with the present invention.

DETAILED DESCRIPTION OF THE PREFERRED EMBODIMENT

Figure 7A:
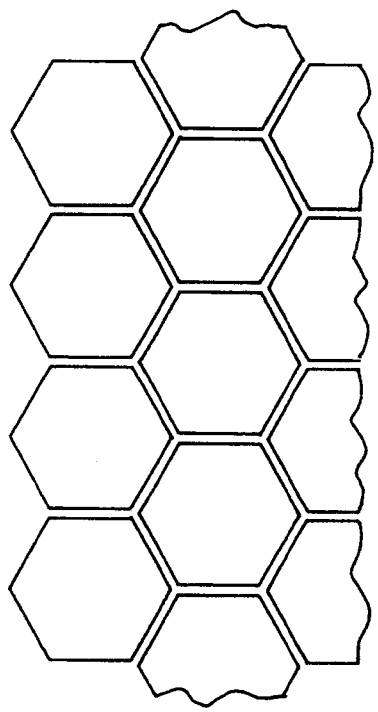
FIG. 7A-7D illustrates shunt elements formed in various shapes and patterns according to the present invention.

Turning now to the drawings, indicated generally at 10 in FIG. 1 is an exploded perspective view of a transducer constructed in accordance with the present invention. Included in transducer 10 are first and second polyester films 12, 14, respectively. Films 12, 14 are also referred to herein as substantially nonconducting substrates. Film 14 includes a substantially planar surface 16 upon which a resistive layer 18 is mounted. Resistive layer 18 is also referred to herein as a conducting element or substantially planar layer and is preferably formed from carbon ink screen printed onto surface 16. Such carbon ink preferably has a resistance of 5,000 to 50,000 ohms per square. Resistive layer 18 includes a substantially planar exposed surface 20. Conducting contacts 22, 24 are electrically connected to opposing ends of resistive layer 18. Contact 24 is integrally formed with a terminal pad 26 while contact 22 is integrally formed with terminal pad 28. Preferably terminal pads 26, 28 are also screen printed on surface 16 prior to screen printing resistive layer 18.

A plurality of shunt elements, like elements 30, 32 are mounted on a downward-facing substantially planar surface 34 (in FIG. 2A) of film 12. Preferably, each of the shunt elements has a higher conductivity than resistive layer 18 and is preferably silver or carbon ink which is screen printed on surface 34. Each shunt element includes an exposed surface, like surface 36 (in FIG. 2A) on shunt element 32, which is directed toward surface 20 on resistive layer 18.

As can be seen in FIG. 1, the shunt elements, like shunt elements 30, 32 are arranged in rows and columns staggered relative to one another. The arrangement of the shunt elements is also referred to herein as a cluster or pattern with each shunt element in the embodiment of transducer 10 having a substantially rectangular shape.

In operative condition, sheets 12, 14 are positioned as shown in FIG. 2A, i.e., each of the shunt surfaces, like shunt surface 36, is substantially flushly abutting surface 20 on resistive layer 18. The underside of sheet 14 is typically supported by a substantially planar support surface (not shown) and an actuator (also not shown) is applied to the top surface of film 12 thereby urging the shunt element surfaces against the resistive layer surface with a force which varies proportional to pressure applied by the actuator.

A resistive measuring device, such as an ohmmeter, is applied across terminals 26, 28 thereby setting up an electrical field oriented as indicated by an arrow 38 in FIGS. 2A and 2D. When the actuator is applying no force, the resistance detected across terminals 26, 28 is substantially equal to that of resistive layer 18 with the shunt elements, like elements 30, 32, having essentially no contact with surface 20. With reference to FIG. 2A, when the actuator applies some pressure, an electric current, indicated by current path 40 in FIG. 2A, is set up in layer 18. As illustrated schematically in FIG. 2B, pressure on each of the shunt elements, like shunt element 32, creates contact points 42, 44, 46, 48 through which current flows between layer 18 and shunt element 32.

It should be appreciated that current path 40 is actually a representation of a very large number of parallel current paths through resistive layer 18. As pressure is applied by the actuator, the contact points, like contact points 42, 44 in FIG. 2A, are created thus causing the current to flow from path 40 through contact point 42 into shunt 32, along a current path 49 and out of the shunt at contact 44, thereafter continuing to flow in resistive layer 18. Because in the preferred embodiment resistive layer 18 is of substantially higher resistance than shunt element 32, only a small amount of current, indicated by current path 50 between contact points 42, 44, flows in resistive layer 18 between contact points 42, 44. It will be appreciated that this has the effect of substantially shorting the resistance the resistance in layer 18 between contact points 42, 44 and thus lowering, albeit very slightly in the case of a single current path, the total resistance measure between terminal paths 26, 28.

The resistance, as measured across pads 26, 28, in resistive layer 18, e.g., seen by the current in path 40, is determined by the length of the current path in layer 18, the sheet resistance of layer 18 and by the area and geometry of the resistive layer. The resistance, as measured across pads 26, 28, to current flowing in shunt element 32, e.g., the current in path 49, is determined by the resistance across each contact point 42, 44 as well as the length of current path 49 in the shunt element, the sheet resistance of the shunt element and by the area and geometry of the shunt element. In practice, the resistance of a selected shunt element, like shunt element 32, can be assumed to be negligibly small. This means that the overall resistance to current in paths 40, 49, as measured across paths 26, 28, is largely dependant on the sheet resistance of resistive layer 18, the distance travelled through the resistance layer, the contact resistances across both of contacts 42, 44 and the distance between contacts 42, 44.

FIG. 2C illustrates a pressure versus resistance relationship for each of contacts points 42–48. The curves identified with the numerals 42a, 46a, 44a, 48a in FIG. 2C correspond to the response for varying pressure applied to the transducer at each of the correspondingly numbered points in FIG. 2B. Note that selected points on curves 42a, 46a are subject to approximately the same pressure but have significantly different resistances. Similarly, contact points 44, 48 may be subject to different pressures and have approximately the same resistances. In practice, both these conditions are seen and it is difficult to control the pressure to resistance relationship of each contact point as it is difficult to control the force or pressure applied to each contact point. Minor surface variations and microprotrusions in the shunts or in resistive layer 18 produce variations in force applied to each contact point 42–48. Minor surface variations and microprotrusions in the shunts or in resistive layer 18 also produce variations in the force to resistance relationships of each of the contact points.

The change in resistance due to each current path, like current path 49, passing through one of the shunts is rather limited. Only when a plurality of shunt elements form current paths in unison does the resistances measured across pads 26, 28 change significantly. This means that any nonlinearities or noise introduced by each individual current path through a shunt element is limited. Only when a plurality of current paths are routed through the shunt elements in unison does the resistances across pads 26, 28 change significantly.

If the resistance across a single contact point changes, even significantly, the net result is unlikely to change significantly, i.e., the resistance across terminals 26, 28 is not significantly affected. The net result changes only when a significant percentage of the contacts, like contacts 42–48, change in unison, i.e., when a greater number of contact are made (or broken in the case of decreasing pressure) and/or the resistance across each contact is lowered (or raised in the case of decreasing pressure) responsive to pressure applied by an actuator.

Each contact point 42–48 on shunt element 32 can be considered a separate transducer with its own response as illustrated by the curves in FIG. 2C. It is all of the contact points acting in unison which produce the response of the transducer of the present invention.

FIG. 2D illustrates some exemplary current paths among adjacent shunt elements as a result of the electrical field indicated by arrow 38 and by pressure applied to the transducer. Because the shunt elements are electrically isolated from one another, the only path from one element to another is through resistive layer 18. It can be seen that current can flow from a single contact point in one shunt element into resistive layer 18 and to different contact points which may be on the same shunt element or on a different one. Similarly, current can flow from different contact points into a shunt element and thereafter to a single contact point back into resistive layer 18.

FIG. 3 illustrates the resulting pressure to resistance curve, as measured across pads 26, 28, of transducer 10 in FIG. 1. As contrasted with the prior art note that the response is nearly linear and can be assumed to be linear in many applications.

Also as contrasted with the prior art, when no pressure is applied, the resistance across resistive layer 18 is constant. As pressure increases, there is no change until an initial activation threshold 52 is passed. At threshold 52, at least two contact points on a shunt element in transducer 10 contact resistive layer 18. Contact points tend to be clustered due to naturally occurring nonuniform distribution of microprotrusions on the surfaces of both the shunt elements and the resistive layer 18. This increases the chance that the initial contacts made responsive to pressure applied to the transducer will be on the same element thereby requiting a relatively small amount of pressure to reach threshold 52. Beyond threshold 52, an increasing number of contacts between the shunt elements and resistive layer 18 are formed. After each contact point is formed, the change in resistance across each point tends to decrease in a nonlinear fashion. The relatively rapid increase in the total number of contacts combined with the non-linear decrease in resistance across each contact results in steadily decreasing net resistance in a nearly linear fashion through the operating range of the transducer as indicated by the curve in FIG. 3.

At higher pressures, the rate at which additional contacts are formed slows and the resistance of the contacts tends to reach a lower limit. This produces a saturation range 54 at very high operating pressures. As pressure is reduced, the effects are reversed and the net resistance follows the same curve back to the initial condition in which no pressure is applied.

FIG. 4A is a schematic representation of an array of transducers, like transducers 55, 57, connected in serial with one another. Each of the transducers includes a pair of lines, like lines 59, 61 on transducer 57, upon which an output is generated responsive to energy applied to the transducer. The array includes outputs, like outputs 63, 65, equal the sum of the outputs of each transducer in the array responsive to energy applied to the array. If the transducers in the array of FIG. 4A are considered to be prior art force sensitive transducers, the array output is equal to the sum of the resistances of each transducer in the array. It can be seen that if one transducer in the array produces a single abnormally high resistance, it will dominate the response of the array.

FIG. 4B is a schematic representation of the transducers of FIG. 4A reconfigured to be connected in parallel with one another. In FIG. 4B outputs 63, 65, equal the parallel addition of each transducer in the array. If the transducers in the array are considered to be prior art force sensitive transistors, the resistance of the array measured across outputs 63, 65 equals $1/((1/R_{55})+(1/R_{57})\ldots +(1/R_n))$ where $R_n$ is equal to the resistance of each transducer in the array. It can be seen that a single abnormally low resistance in the array of FIG. 4B will dominate the response of the array.

FIG. 5A is a schematic representation of the transducers of FIGS. 4A and 4B reconfigured to be connected so that substantially all of the transducer lines are connected to a plurality of other transducer lines via a connection weighting element, like elements 67, 69. In FIG. 5A, multiple output lines, like lines 59a, 59b, 61a, 61b, are provided for each transducer. The output generated by transducer 57 on lines 59, 61 in FIGS. 4A and 4B is applied to lines 59a, 59b, 59c, and 61a, 61b, respectively, in FIG. 5A. The configuration of FIG. 5A is referred to herein as connecting substantially all of the transducers to other transducers by series connections and by parallel connections. If the transducers in the array are considered to be prior art force sensitive transducers and the weighting elements are considered to be fixed resistances, the current flowing due to a voltage applied across outputs 63, 65 is equal to the sum of all of the current flowing in each of the current paths, like illustrated path 71. The array of FIG. 5A operates in a manner similar to that described for transducer 10.

This can be seen by considering the array of FIG. 5A now to be a model of transducer 10 with each transducer, like transducers 55, 57, being considered a contact point, like points 42, 44 (in FIG. 2B), in transducer 10. Weighting elements, like elements 67, 69, represent resistive layer 18 in transducer 10. It should be noted that the contact points represented in the model of FIG. 5A can be on the same shunt elements or on different ones. In practice, every contact point may be connected to every other contact point thereby creating a tremendously large number of possible current paths. A change in the current flowing in a single path has relatively little effect of the total current measured at outputs 63, 65. Only when the resistances of many of the contact points change together is there appreciable change in the current measured at outputs 63, 65. While the overall level of the response may be less than that of the transducer arrays of FIGS. 4A and 4B, noise and linearity are improved with the array of FIG. 5A. The series and paralled connections of the transducers (contact points) permits each transducer to contribute to the total array response regardless of the position of the transducer (contact point) in the array. The weighting element (resistive layer 18) tends to smooth and average the array response.

FIG. 5B illustrates a more specific schematic of transducer 10 than that of FIG. 5A. Each resistor in the array represents a single contact point with the resistance value varying responsive to pressure. Numerous multiple current paths are positioned between array outputs 63, 65.

In FIG. 6A, a transducer constructed in accordance with the present invention includes structures corresponding to and numbered the same as that previously described. The films, like films 12, 14 in FIG. 1 are omitted from the view of FIG. 6A but it should be appreciated that the transducer of FIG. 6A is constructed and operates generally in the same manner as transducer 10. Because the transducer of FIG. 6A produces multiple current paths as illustrated therein, it does not operate in accordance with the model of FIG. 4A but rather with that of FIG. 5.

In FIG. 6B, a transducer constructed in accordance with the present invention includes structure corresponding to and numbered the same as that previously described. The films, like films 12, 14 in FIG. 1 are omitted from the view of FIG. 6B but it should be appreciated that the transducer of FIG. 6B is constructed and operates generally in the same manner as transducer 10. Because the transducer of FIG. 6B produces multiple current paths as illustrated therein, it does not operate in accordance with the model of FIG. 4B but rather with that of FIG. 5.

FIGS. 7A-7D show transducer shunt elements formed in various shapes and patterns. It is to be appreciated that the shunt elements illustrated in FIGS. 7A-7D are mounted on a film, like film 12 in the transducer of FIG. 1, and that a corresponding resistive layer, like resistive layer 18, are provided but are not illustrated in the views of FIGS. 7A-7D for the sake of clarity. In each figure, the direction of applied electrical field can be any orientation but a vertically oriented field is preferred. In FIG. 7A, a hexagonal pattern is useful for its regular shape and the high number of immediate neighbors (6) for each element.

Figure 7B:
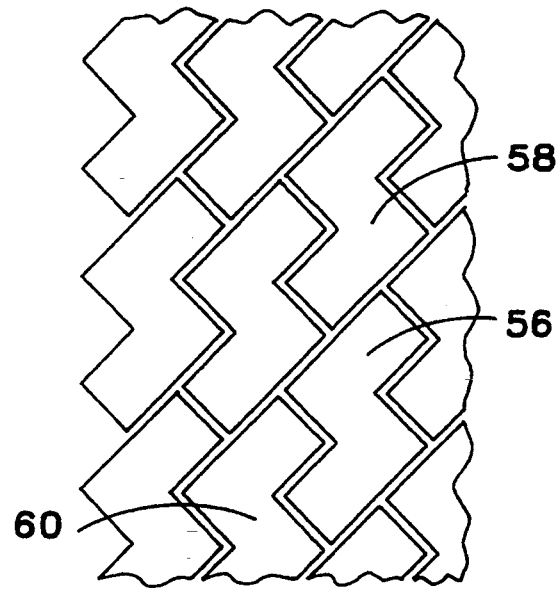

FIG. 7B illustrates a zig-zag pattern. Each shunt element has several different geometric relationships with adjacent elements. For example, because shunt element 56 and shunt element 58 share a relatively short adjacent boundary, the average distance between contact points on elements 56, 58 is comparatively high. On the other hand, shunt elements 56, 60 have a larger common boundary and therefore shorter average distance between contact points. This difference changes the uniformity of resistance between contact points on different shunt elements and hence the response of the transducer.

Figure 7C:
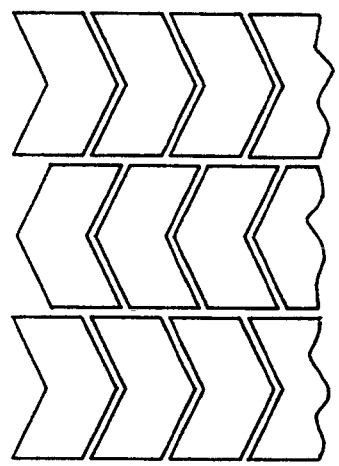

FIG. 7C illustrates offset rows of shunt elements having a nested chevron configuration. With a vertically oriented direction of applied electrical field, the shortest current paths tend to cross pairs of shapes, thus multiplying the tendency for contact points on additional shunts to contribute current paths. Increasing the number of shunts and the number of contact points which contribute current paths stabilizes the transducer response.

Figure 7D:
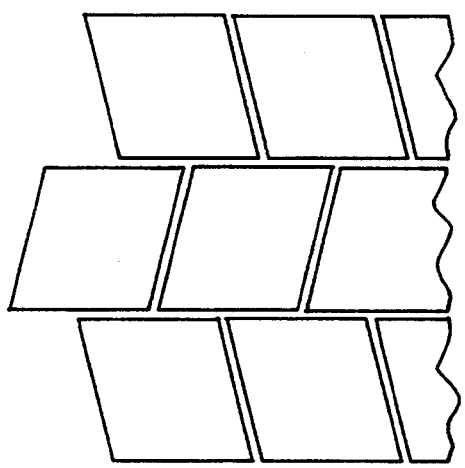

FIG. 7D illustrates a row of staggered slanted blocks. This pattern also tends to increase the number of contact points on different shunt elements which contributes additional current paths. As the distance from a given contact point on a selected shunt grows in the preferred vertical direction of applied field, the probability that a contact will be encountered on a different shunt also grows. This means that a current path through this pattern tends to take multiple shunts thus increasing the number of alternative current paths and improving transducer linearity.

It is desirable to select shapes and patterns which maximize the number and uniformity of local interconnections between elements. This improves transducer linearity and stability at some cost to sensitivity. Sensitivity can be compensated for by simple external amplification whereas compensating for linearity and stability externally is much more costly. The spacing between individual shunt elements may also be varied to produce changes in transducer response and linearity as well.

Shapes which are longer along the axis of applied field tend to result in a transducer having a wider signal swing, greater sensitivity and decreased linearity. Shapes that are wider tend to improve sensitivity, at some cost to linearity. A higher number of shunt elements in a given area result in lower sensitivity and better linearity as compared to lower numbers of elements in the same given area. Such variations are illustrated the shunt element sizes and patterns shown in FIGS. 8A, 8B and 8C.

Figure 8A:
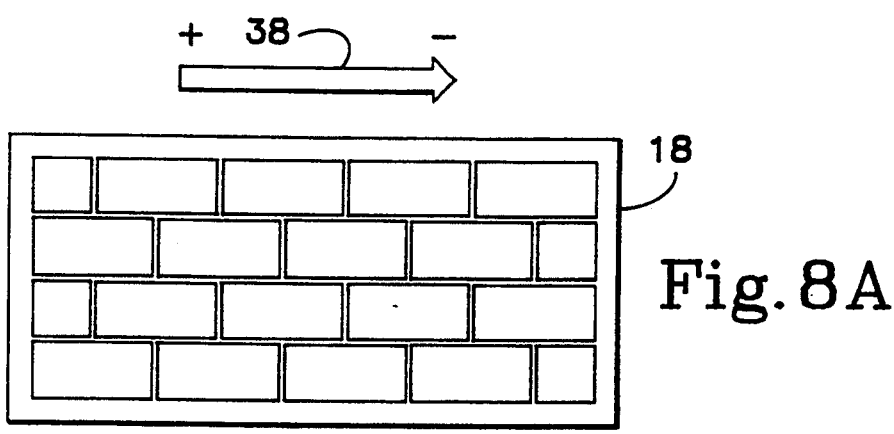
FIGS. 8A-8C illustrate transducer shunt elements in a range of sizes according to the present invention.
Figure 8B:
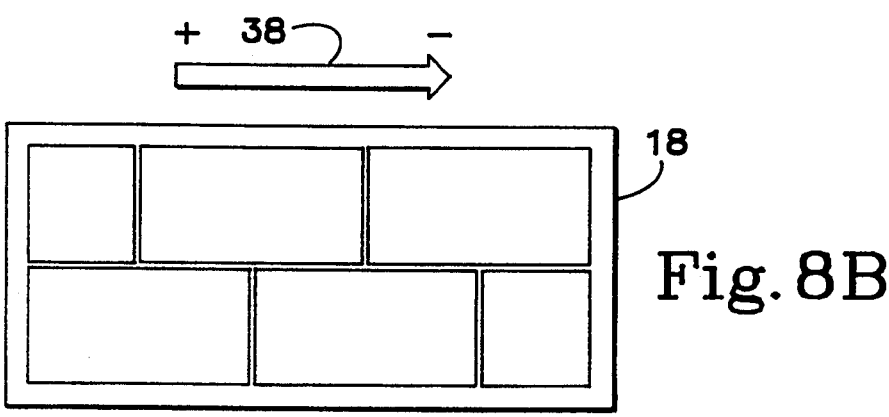
Figure 8C:
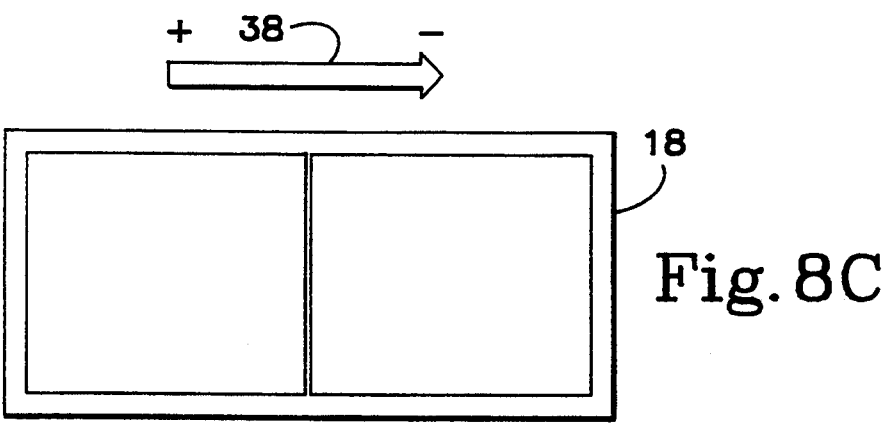

FIG. 8A illustrates a plurality of shunt elements pressed against resistive layer 18. As with embodiments described in FIG. 7A-7D, the remaining structure of the transducer is not illustrated for purposes of illustration. It is to be appreciated, however, that similar structure as described in connection with transducer 10 in FIG. 1 including the films contacts, pads, actuator, etc. are provided and operate generally as described in connection with transducer 10. In FIG. 8A, rows of shunt elements are arranged in a staggered pattern. FIG. 8B shows a similar pattern of shunt elements with each shunt element in the pattern of FIG. 8B being longer and wider than shunt elements of FIG. 8A. Fewer shunt elements are therefore present in the same area in the embodiment of FIG. 8B. With reference to FIG. 8C, only two shunt elements are provided which together cover substantially the same area as the shunt elements of FIGS. 8A and 8B.

Figure 8D:
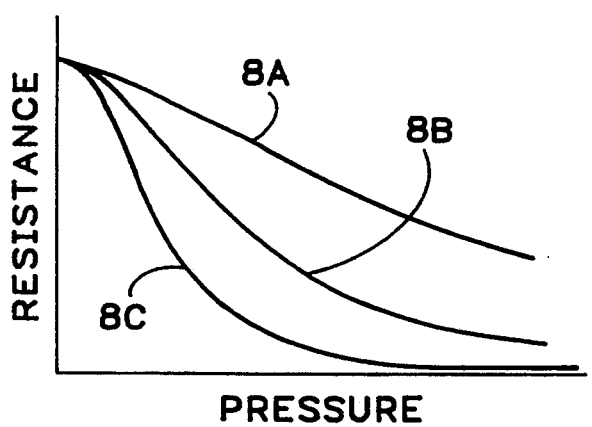
FIG. 8D is a graph illustrating the pressure versus resistance responses for transducers having the shunt element patterns illustrated in FIGS. 8A-8C.

FIG. 8D is a graph of pressure versus resistance relationships for each of the transducers of FIG. 8A, 8B and 8C with each curve being identified with the corresponding figure number in FIG. 8D. It can be seen that curve 8A is comparatively linear but less sensitive, i.e., has a smaller change in resistance over pressure, as compared to curves 8B and 8C. Curve 8B is more sensitive and more non-linear than curve 8A but not to the extent of curve 8C.

Depending upon the response desired, i.e., pressure-to-resistance relationship, a shape, size, number of shunt elements and pattern can be selected to achieve a particular result. Each of these parameters are easily controlled in manufacturing; it is thus easy to control the uniformity and response of transducers manufactured in accordance with the present invention. Screen printing, for example, allows very good control of shape, size and patterns of shunt elements.

Figure 9A:
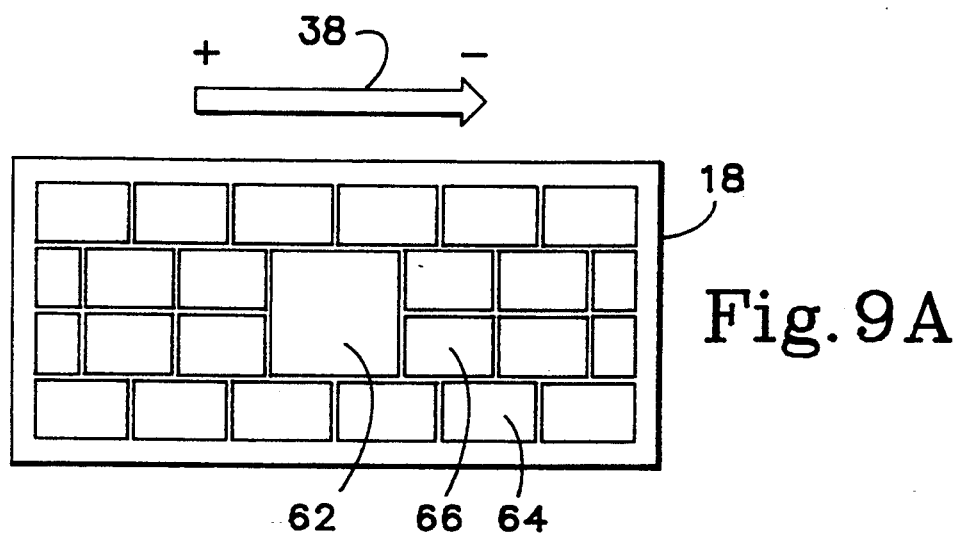
FIGS. 9A and 9B illustrate transducers having shunt elements formed in various shapes and patterns according to the present invention to achieve differences in positional sensitivity.

Turning now to FIG. 9A, a large central shunt element 62 is surrounded by smaller outlying shunt elements, like elements 64, 66. In FIG. 9A, the central portion of the transducer tends to exhibit a response predictable for a single large shunt element, namely high sensitivity and strong nonlinearity. The outlying portion of the transducer tends to exhibit a response predictable for plurality of smaller shunt elements, namely reduced sensitivity and good linearity.

Figure 9B:
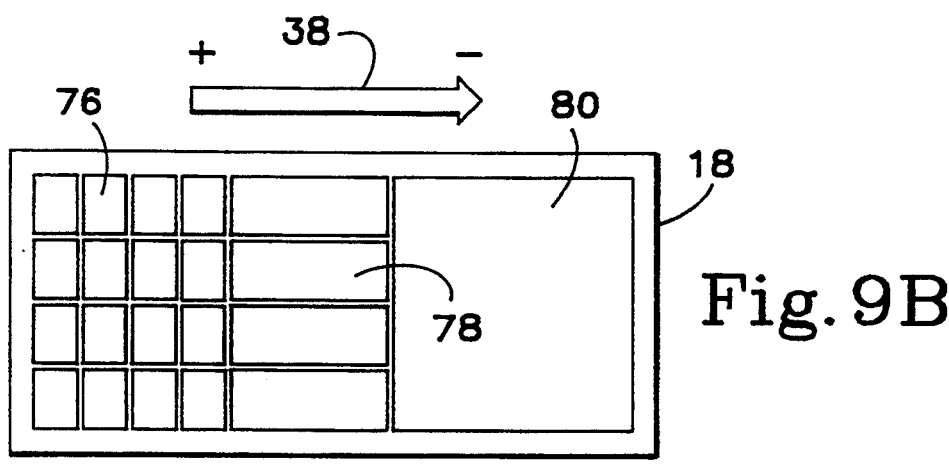
Figure 9C:
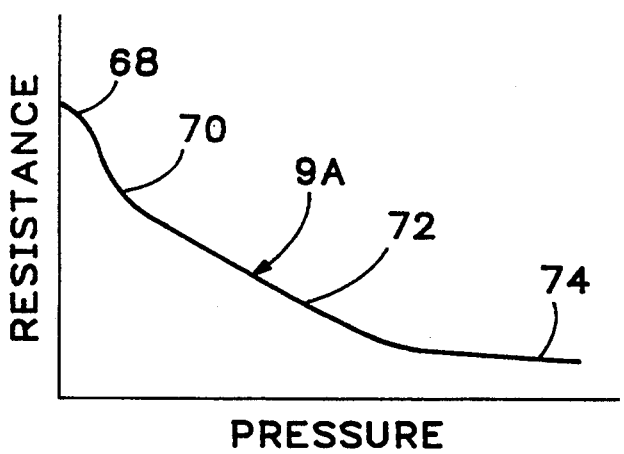
FIG. 9C is a graph showing the pressure to resistance response of the transducer of FIG. 9A.

FIG. 9C illustrates a pressure response curve 9A for the transducer of FIG. 9A when actuated by a spherical deformable member. Them is an initial dead zone 68 at very low pressures until a pair of contacts between shunt element 62 and resistive layer 18 occur. Because the surface of the transducer is being actuated nonuniformly by a spherical shape, i.e., as force is applied a progressively larger area is covered, central shunt 62 is the first area to form contacts. An initial response zone 70 shows a sensitive, nonlinear response. In a central zone 72, central shunt 62 is essentially saturated and the response is dominated by the smaller shunt elements, like shunt elements 64, 66. At higher pressures, all elements reach saturation in terms of the number of contacts as well as resistance across each contact and the response of the transducer flattens as shown in saturation zone 74.

FIG. 9B illustrates another shunt element configuration wherein three areas of different patterns produce three types of response. In the area incorporating the smallest shunt elements, like shunt element 76, the response is nearly linear but not very sensitive. In the area of medium-sized shunt elements, like shunt element 78, the response is intermediate while in the area of a single large shunt element 80, the response is sensitive but strongly nonlinear. An operator can select the desired response by pressing an actuator (not shown) on the appropriate area. If slow, smooth control is required, the operator presses the area in which the smaller shunts, like shunt 76, are located. If an intermediate linear response is desired, the operator presses in the area of the medium-sized shunts, like shunt 78. If rapid nonlinear response is required, the operator can press the actuator on shunt 80. Of course, pressing the border between the different sized shunt elements results in a response that is intermediate to that of the two types of shunt elements. Thus, an operator control with an easily selectable response is provided.

Figure 10A:
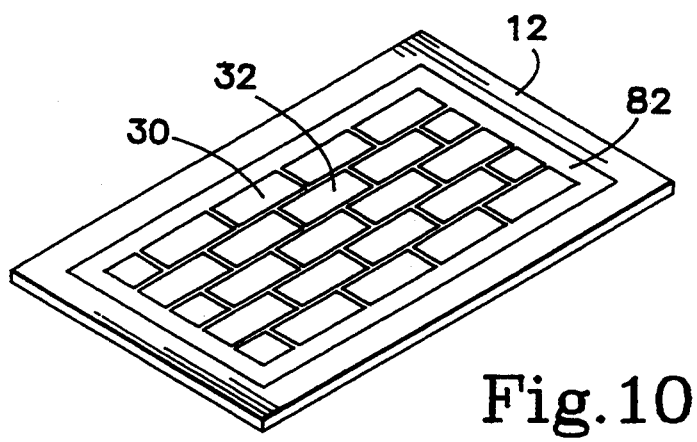
FIG. 10A is a perspective view of another embodiment of a transducer constructed in accordance with the present invention having conductive shunt elements which are partially electrically isolated from one another as a result of being mounted on a resistive layer.

Considering now another embodiment of a transducer in FIG. 10A, the shunt elements, like shunt elements 30, 32 are not mounted directly on film 12 as in transducer 10 in FIG. 1 but rather on a high resistance background layer 82. Thus, each shunt element is only partially electrically isolated from each other shunt element. Each shunt element can therefore participate in the overall transducer response with only a single contact point made between the shunt element and resistive layer 18 (not shown in the view of FIG. 10) because the shunt element is already partially connected, via resistive layer 82, to all the other elements. Generally, layer 82 is a high resistance material as the only effective resistance occurs in the relatively narrow gaps between each shunt element.

Figure 10B:
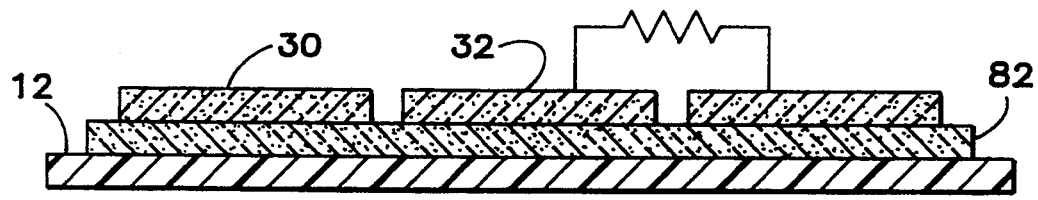
FIG. 10B is an enlarged sectional view of a portion of transducer of FIG. 10A.

As can be seen in FIG. 10B, resistive layer 82 is formed directly on film 12 with each of the shunt elements, like shunt elements 30, 32, being formed on resistive layer 82. There is therefore a finite resistance, one instance being represented by a schematic representation of a resistor, between a selected shunt element and each other shunt element on layer 82.

Figure 10C:
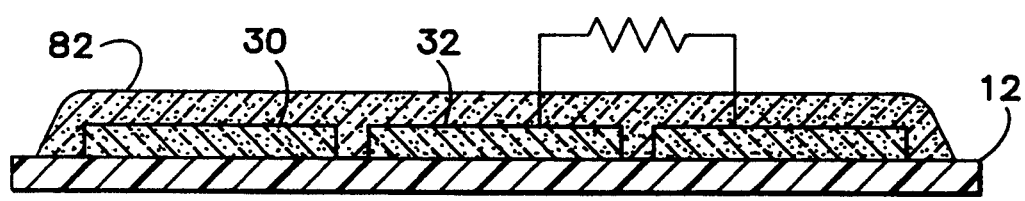
FIG. 10C is a view similar to view 10B showing another embodiment of the invention.

FIG. 10C illustrates an alternative embodiment wherein the shunt elements, like shunt elements 30, 32, are formed directly on film 12 as is the case with transducer 10 in FIG. 1. Resistive layer 82 is thereafter formed over the shunt elements thereby electrically connecting the shunt elements with one other as depicted by a schematic representation of a resistor. In the transducer of FIG. 10C, layer 82 is pressed by an actuator (not shown) against an opposing resistive layer, like layer 18 in FIG. 1. The presence of the shunt elements, like shunt elements 30, 32 in FIG. 10C, beneath the surface of layer 82 results in locally lower resistances on the surface of layer 82 which provides adjacent current paths when surface 82 is pressed against a resistive layer, like resistive layer 18 as described in connection with transducer 10.

Turning now to FIG. 11A, film 12 includes thereon a plurality of conductive elastomeric bumps, like bump 84. Elastomeric bumps in the transducer of FIG. 11A serve the same purpose as the shunt elements in the previously described transducers. The bumps may be formed in several shapes and by a variety of means, for example molded spherical sections as in FIG. 11A, screen printed rectangles, or other shapes. As previously mentioned, conductive elastomeric bumps have a number of advantages and disadvantages compared to screen printed conductive inks or hard contacts. When bumps 84 are urged against an opposing resistive layer, like layer 18 in FIG. 1, the bumps short selected portions of the resistive layer as previously described herein.

In the embodiment of FIG. 1B, an elastomeric sheet 86 includes a plurality of conductive elastomeric zones, like zone 88. In the embodiment of FIG. 11B, elastomeric sheet 86 is either nonconductive or has a relatively high resistance with zones 88 being at a lower resistance than sheet 86. The conductive zones, like zone 88, in the transducer of FIG. 11B, therefore serve the same purpose as the shunt elements when sheet 86 is urged against a resistive layer, like layer 18, as described in connection with previous embodiments of transducers herein.

Turning now to FIG. 12, indicated generally at 90 is a four element variable resistance pressure sensitive transducer constructed in accordance with the present invention. As is described in more detail hereafter, the transducer has four pressure sensing areas each comprising a resistive surface having a pair of contact electrodes applied thereto and an opposing pattern of shunt elements. Transducer 90 is especially adapted for use in an isometric joy stick pointing device embedded in a computer keyboard. An example of such a device is disclosed in U.S. Pat. No. 5,124,689 assigned to the assignee of the present application and incorporated herein by reference. Each pressure sensing area detects pressure in one of four orthogonal directions.

A nonconducting film 91 supports terminal pads, like pads 92, 94 and the electrical traces, like trace 96 to which each pad is connected. Pad 92 is connected to a trace which in turn is connected to each of four resistive layers, like layers 98, 100. Each of the other four pads is connected to one of the four layers. The layers, like layers 98, 100 are formed in the same fashion and function in substantially the same manner as layer 18 in transducer 10.

A plurality of shunt elements are arranged in patterns, indicated by dashed boxes, one of which is box 102. Each of the patterns of shunt elements is formed on the underside of a second film 104 opposite a corresponding resistive layer, like layers 98, 100, on film 91. Clearance holes 106, 108 are formed in films 104, 91 respectively, to permit passage of a key switch mechanism (not shown in FIG. 12) therethrough. An adhesive (not visible) is formed on the underside of a tab 110 formed in film 104. The adhesive layer attaches films 104, 91 to one another and maintains alignments of each shunt element pattern, like pattern 102, opposite its corresponding resistive layer, like layers 98, 100. Each of the four pressure sensitive areas in transducer 90 operates as previously described herein responsive to pressure applied by the computer key switch referred to above.

There are many possible methods of electrically connecting the four pressure sensing areas in transducer 90. As shown, the four areas share a common lead, connected to pad 92, with each having a separate connection to a different one of the other pads. Another useful configuration is a differential voltage divider wherein resistive layers 98, 100 are connected in series. A voltage is applied across the series connected layers and the voltage at the common connection of the two layers is measured. If the response of the two transducers incorporating layers 98, 100 is sufficiently linear and sufficiently identical, the result is a voltage corresponding to the differential actuation of the two transducers.

Figure 13A:
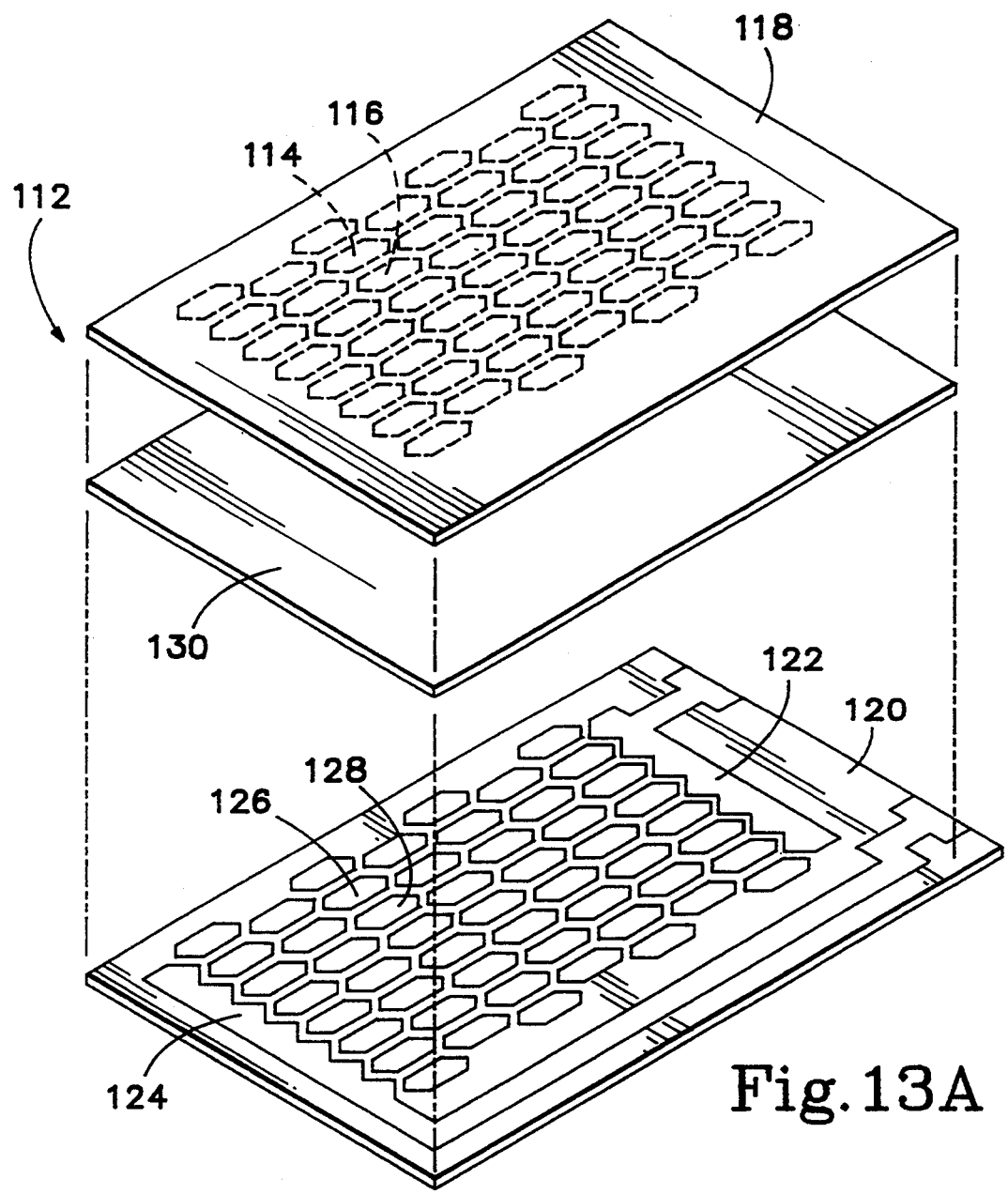
FIG. 13A is an exploded perspective view of a capacitive force transducer constructed in accordance with the present invention.
Figure 13B:
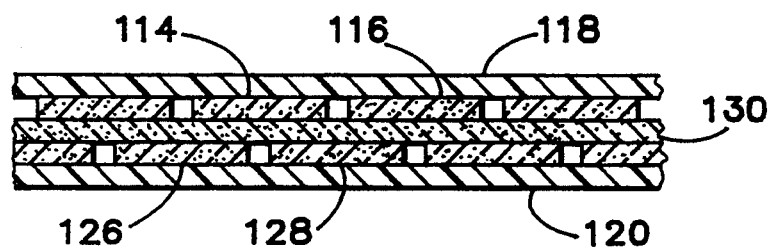
FIG. 13B is an enlarged cross-sectional view of the transducer of FIG. 13A.

Attention is directed to FIG. 13 A wherein another transducer constructed in accordance with the present invention is indicated generally at 112. Transducer 112 converts a change in applied force or pressure to a change in capacitance.

A plurality of plate elements, like elements 114, 116, are formed on a downward facing surface of a polyester film 118. A second polyester film 120 includes electrical contacts 122, 124 formed thereon. Plate elements, like plate elements 126, 128, are formed on film 120 between contacts 122, 124. A dielectric layer 130 is disposed between the plate elements on film 118 and those on film 120. Layer 130 is preferably resiliently deformable as in the case of a rubber sheet.

When force is applied to transducer 112 in a manner which compresses dielectric layer 130, the plates on film 118 are urged toward those on film 120. This results in an increase in capacitance as measured across contacts 122, 124. The opposed, overlapping sets of plates forms a plurality of capacitors. Uneven compression resulting in local increases in capacitance does not unduly effect the total capacitance as measured at contacts 122, 124. Similarly local shorting between opposing plates does not render the transducer useless. The affected plates simply no longer contribute to the output as measured across the electrical contacts.

It should be appreciated that the transducer array of the present invention can be implemented in many forms. For example, the shunt elements can have a higher resistance, e.g., carbon could be used to form the shunt elements, than the resistive layer to produce a very linear and smooth transducer but with relatively low sensitivity. In addition materials other than carbon or silver inks can be used in the transducer, e.g., conductive plastic. Other transducers which respond to light, temperature, etc., can be used to implement the present invention. The weighting between the elements, which smooths and averages the array response compared to the response of a single transducer in the array, is typically resistive in the case of an array in which current flows. The weighting element, however, could take other forms, such as mechanical, in transducer arrays in which current does not flow. The smoothing and avenging is provided without computation, somewhat like a neural network having active elements.

Having illustrated and described the principles of our invention in a preferred embodiment thereof, it should be readily apparent to those skilled in the art that the invention can be modified in arrangement and detail without departing from such principles. I claim all modifications coming within the spirit and scope of the accompanying claims.

We claim:

1. A transducer for generating a resistance value representative of force applied thereto comprising:
   a conducting element having an exposed surface;
   a first contact electrically connected to one side of said conducting element;
   a second contact electrically connected to an opposite side of said conducting element;
   means for creating a current flow in said conducting element;
   a plurality of shunt elements each of which has an exposed surface generally directed toward the exposed surface on said conducting element;
   means for urging said shunt element surfaces against said exposed surface of said conducting element;
   wherein said shunt elements operated to shunt;
   a portion of the current flow in said conducting element through said shunt elements when a current flow is created in said conducting element and said shunt element surfaces are urged against said exposed surface of said conducting element.

2. The transducer of claim 1 wherein said transducer further includes means for applying a progressively increasing force to said elements in a manner which increases electrical contact between said shunt surfaces and said exposed surface of said conducting element.

3. The transducer of claim 2 wherein said transducer further includes means for measuring the change in resistance in said conducting element responsive to variations in such force.

4. The transducer of claim 1 wherein said conducting element comprises a substantially planar layer.

5. The transducer of claim 4 wherein said transducer further comprises a substantially nonconducting substrate and wherein said conducting element comprises a layer of ink formed on said substrate.

6. The transducer of claim 5 wherein said ink carbon ink.

7. The transducer of claim 1 wherein said shunt elements are arranged in a substantially serial sequence between said first and second contacts.

8. The transducer of claim 1 wherein said shunt elements are arranged in a substantially serial sequence across and normal to a line between said first and second contacts.

9. The transducer of claim 1 wherein said shunt elements are generally arranged in both rows and columns between said first and second contacts.

10. The transducer of claim 9 wherein said rows are staggered relative to one another.

11. The transducer of claim 1 wherein said transducer further comprises a substantially nonconducting substrate and wherein said shunt elements each comprise a substantially planar layer of ink formed on said substrate.

12. The transducer of claim 11 wherein said ink comprises silver ink.

13. The transducer of claim 11 wherein said ink comprises carbon ink.

14. The transducer of claim 11 wherein said each of said shunt elements is substantially rectangular.

15. The transducer of claim 11 wherein each of said shunt elements is substantially hexagonal.

16. The transducer of claim 1 wherein said shunt elements and said conducting element have different conductivities.

17. The transducer of claim 16 wherein said shunt elements have a higher conductivity than said conducting element.

18. The transducer of claim 1 wherein substantially all of said shunt elements are each arranged in non-contacting relationship with one another.

19. A transducer for sensing force comprising:
   a first substantially nonconducting film;
   a substantially planar conducting element formed on said first film;
   a first contact electrically connected to one side of said conducting element;
   a second contact electrically connected to an opposite side of said conducting element;
   a second substantially nonconducting film;

a plurality of shunt elements mounted on said second film to form a cluster of shunt elements, said second film being arranged opposite said first film with said conducting element and said shunt elements facing one another;

means for compressing said shunt elements against said conducting element; and means for measuring the change in the resistance between said first and second contacts responsive to variations in electrical contact between said shunt elements and said conducting element.

20. The transducer of claim 19 wherein said means for compressing said shunt elements against said conducting element comprises:

a substantially planar support surface for supporting said films; and a keyboard key having a lower surface disposed above said films and being urgeable thereagainst for compressing said films between said lower surface and said support surface.

21. The transducer of claim 19 wherein said conducting element comprises a layer of ink.

22. The transducer of claim 19 wherein said shunt elements are arranged in a pattern between said first and second contacts, 23. The transducer of claim 22 wherein said each of said shunt elements is substantially rectangular.

24. The transducer of claim 19 wherein said shunt elements comprise a substantially planar layer of ink.

25. The transducer of claim 24 wherein said ink comprises silver ink.

26. The transducer of claim 24 wherein said ink comprises carbon ink.

27. The transducer of claim 19 wherein said substantially planar conducting element is made of carbon material.

28. The transducer of claim 19 wherein said shunt elements and said conducting element have different conductivities.

29. The transducer of claim 28 wherein said shunt elements have a higher conductivity than said conducting element.

30. The transducer of claim 19 wherein substantially all of the shunt elements mounted on said second film are each arranged in non-contacting relationship with the other shunt elements mounted on said second film.

31. A method for making a transducer for generating a resistance value representative of force applied thereto comprising the steps of:

forming a substantially planar conducting element on a first planar surface;

connecting a first electrical contact to one side of the conducting element;

connecting a second electrical contact to an opposite side of said conducting element;

forming a plurality of shunt elements on a second planar surface; and positioning said shunt elements generally opposite said planar conducting element.

32. The method of claim 31 wherein the step of forming a substantially planar conducting element on a first planar surface comprises the step of forming a substantially planar conducting element on a substantially nonconducting film.

33. The method of claim 32 wherein the step of forming a substantially planar conducting element comprises the step of screen printing the conductive element.

34. The method of claim 33 wherein said conducting element comprises carbon ink.

35. The method of claim 31 wherein the step of forming a plurality of shunt elements having a different conductivity from said conducting element on a second planar surface comprises the step of forming such shunt elements on a nonconducting film.

36. The method of claim 35 wherein the step of forming a plurality of shunt elements comprises the step of screen printing the shunt elements.

37. The method of claim 36 wherein said shunt elements comprise carbon ink.

38. The method of claim 36 wherein said shunt elements comprise silver ink.

39. The method of claim 31 wherein said shunt elements and said conducting element have different conductivities.

40. The method of claim 39 wherein said shunt elements have a higher conductivity than said conducting element.

41. The method of claim 31 wherein said method further includes the step of preselecting one of the following transducer operating characteristics: linearity, sensitivity and noise level.

42. The method of claim 41 wherein the step of preselecting an operating characteristic of said transducer comprises the step of preselecting one of the following parameters: shunt element size, shunt element resistance, number, shunt element shape, shunt element pattern and shunt element interconnection resistance.

43. A transducer for generating a resistance value representative of force applied thereto comprising:

a substantially nonconducting substrate;

a first contact electrically connected to one side of said conducting element;

a second contact electrically connected to an opposite side of said conducting element;

a substantially planar conducting element having an exposed surface, said conducting element comprising a layer of ink formed on said substrate;

a plurality of shunt elements each of which has an exposed surface generally directed toward the exposed surface on said conducting element; and means for urging said shunt element surfaces against said exposed surface of said conducting element.

44. The transducer of claim 43 wherein said wherein said ink comprises carbon ink.

45. The transducer of claim 43 wherein said substantially all of said shunt elements are each arranged in non-contacting relationship with one another.

46. A transducer for generating a resistance value representative of force applied thereto comprising:

a conducting element having an exposed surface;

a first contact electrically connected to one side of said conducting element;

a second contact electrically connected to an opposite side of said conducting element;

a substantially nonconducting substrate;

a plurality of shunt elements, each of which comprises a substantially planar layer of ink formed on said substrate, each ink layer having an exposed surface generally directed toward the exposed surface on said conducting element; and means for urging said shunt element surfaces against said exposed surface of said conducting element.

47. The transducer of claim 46 wherein said ink comprises silver ink.

48. The transducer of claim 46 wherein said ink comprises carbon ink.

49. The transducer of claim 46 wherein each of said shunt elements is substantially rectangular.

50. The transducer of claim 46 wherein substantially all of the ink layers formed on said substrate are each arranged in non-contacting relationship with the other ink layers formed on said substrate.

51. A transducer for sensing force comprising:
a first substantially nonconducting film;
a substantially planar conducting element formed on said first film;
a first contact electrically connected to one side of said conducting element;
a second contact electrically connected to an opposite side of said conducting element;
a second substantially nonconducting film;
a plurality of shunt elements mounted on said second film to form a cluster of shunt elements, said second film being arranged opposite said first film with said conducting element and said shunt elements facing one another and said shunt elements each comprising a layer of ink;
means for compressing said films together; and
means for measuring the change in resistance between said first and second contacts resulting from variations in electrical contact between said shunt elements and said conducting element.

52. The transducer of claim 51 wherein said ink comprises silver ink.

53. The transducer of claim 51 wherein said ink comprises carbon ink.

54. The transducer of claim 51 wherein substantially all of the shunt elements mounted on said second film are each arranged in non-contacting relationship with the other shunt elements mounted on said second film.

55. A transducer for sensing force comprising:
a first substantially nonconducting film;
a substantially planar conducting element formed on said first film, said conducting element being made of carbon material;
a first contact electrically connected to one side of said conducting element;
a second contact electrically connected to an opposite side of said conducting element;
a second substantially nonconducting film;
a plurality of shunt elements mounted on said second film to form a cluster of shunt elements, said second film being arranged opposite said first film with said conducting element and said shunt elements facing one another;
means for compressing said films together; and
means for measuring the change in resistance between said first and second contacts resulting from variations in electrical contact between said shunt elements and said conducting element.

56. The transducer of claim 55 wherein substantially all of the shunt elements mounted on said second film are each arranged in non-contacting relationship with the other shunt elements mounted on said second film.

57. A transducer for sensing force comprising:
a first substantially nonconducting film;
a substantially planar conducting element formed on said first film;
a first contact electrically connected to one side of said conducting element;
a second contact electrically connected to an opposite side of said conducting element;
a second substantially nonconducting film;
a plurality of shunt elements mounted on said second film to form a cluster of shunt elements, said second film being arranged opposite said first film with said conducting element and said shunt elements facing one another;
means for compressing said films together;
means for creating a current flow in said conducting element; and
means for shunting a portion of the current flow in said conducting element through said shunt elements when a current flow is created in said conducting element and said films are compressed together.

58. The transducer of claim 57 wherein substantially all of the shunt elements mounted on said second film are each arranged in non-contacting relationship with the other shunt elements mounted on said second film.

* * * * *